(12) United States Patent
Mugunda et al.

(10) Patent No.: US 11,870,668 B1
(45) Date of Patent: Jan. 9, 2024

(54) SYSTEM AND METHOD FOR MANAGING DATA PROCESSING SYSTEMS AND HOSTED DEVICES

(71) Applicant: Dell Products L.P., Round Rock, TX (US)

(72) Inventors: Chandrasekhar Mugunda, Austin, TX (US); Rui An, Austin, TX (US); Akshata Sheshagiri Naik, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/185,564

(22) Filed: Mar. 17, 2023

(51) Int. Cl.
*H04L 43/08* (2022.01)
*G06F 11/34* (2006.01)
*G06F 11/30* (2006.01)

(52) U.S. Cl.
CPC .......... *H04L 43/08* (2013.01); *G06F 11/3006* (2013.01); *G06F 11/3409* (2013.01)

(58) Field of Classification Search
CPC ... H04L 43/08; G06F 11/3006; G06F 11/3409
See application file for complete search history.

(56) References Cited

U.S. PATENT DOCUMENTS

| | | | |
|---|---|---|---|
| 10,264,003 B1 * | 4/2019 | Wu | H04L 43/08 |
| 2017/0339178 A1 * | 11/2017 | Mahaffey | H04L 41/142 |
| 2018/0307579 A1 * | 10/2018 | Rothchilds | G06F 11/3065 |
| 2019/0108116 A1 * | 4/2019 | Benes | G06F 21/552 |
| 2020/0021885 A1 * | 1/2020 | Li | H04N 21/254 |
| 2023/0156032 A1 * | 5/2023 | Andriani | H04L 63/20 |
| | | | 726/22 |

* cited by examiner

*Primary Examiner* — Azizul Choudhury
(74) *Attorney, Agent, or Firm* — Womble Bond Dickinson (US) LLP (57) ABSTRACT

Methods and systems for managing operation of data processing systems are disclosed. To manage operation of the data processing systems, the data processing systems may collect and use diagnostic data to manage various devices. The diagnostic data may be collected using different processes depending on the state of operable connections between components of the data processing systems, and the capabilities of the devices from which the diagnostic data is collected. The diagnostic data may be collected by invoking collection functionality of the devices, or through management of diagnostic data collection processes by other devices.

20 Claims, 7 Drawing Sheets

SYSTEM AND METHOD FOR MANAGING DATA PROCESSING SYSTEMS AND HOSTED DEVICES

FIELD

Embodiments disclosed herein relate generally to device management. More particularly, embodiments disclosed herein relate to systems and methods to manage the operation of data processing systems and hosted devices that may collect diagnostic data.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. To manage the operation of data processing systems, a management system may obtain information regarding their operation and update their operation based on the obtained information.

The data processing systems, and some devices hosted by the data processing systems, may be implemented using diagnostic data collection enhanced devices. A diagnostic data collection enhanced device may be a device that may include functionality to collect diagnostic data reflecting its operation.

However, the diagnostic data collection capabilities of different diagnostic data collection enhanced devices may vary. Similarly, the ability to collect diagnostic data from diagnostic data collection enhanced devices may depend on the operable connections to the devices.

A data processing system in accordance with an embodiment may take into account both the diagnostic data collection capabilities of and operable connections to diagnostic data collection enhanced devices. Based on the capabilities and connectivity, the data processing systems may implement varying processes for obtaining diagnostic data.

Some processes may utilize diagnostic data collection functionality provided by guest management controllers of the diagnostic data collection enhanced devices, while other processes may use other management controllers to orchestrate diagnostic data collection. For example, the other management controllers may provide details instructions to lower capability devices (also referred to as low complexity devices or components) such as field programmable gate arrays of the diagnostic data collection enhanced device. When the instructions are performed by the lower capability devices, diagnostic data may be collected and provided to the management controller.

Once obtained, the diagnostic data may be used to select management operations for performance by the diagnostic data collection enhanced devices. Performing the management operations may modify the operation of the diagnostic data collection enhanced devices.

By doing so, the likelihood of successfully managing the operation of diagnostic data collection enhanced devices may be improved. For example, the disclosed systems may take into account conditions which may normally disrupt or impair various processes for collecting diagnostic data. By taking these conditions into account and automatically implementing processes for diagnostic data collection that are more likely to succeed, diagnostic data may be more likely to be collected. Thus, embodiments disclosed herein may address, among other technical problems, the technical problem of variation in operating conditions of a data processing system. By proactively identifying operating conditions and selecting how to collect diagnostic data based on the operating conditions, the disclosed data processing system may be more likely to successfully operate under a wider variety of conditions.

In an embodiment, a method for managing diagnostic data collection to manage operation of a data processing system is disclosed. The method may include identifying an occurrence of a diagnostic data collection event for the data processing system; based on identifying the occurrence: performing a communication channel analysis of the data processing system to identify a process for obtaining diagnostic data for a diagnostic data collection enhanced device of the data processing system; obtaining a diagnostic analysis for the diagnostic data collection enhanced device using the diagnostic data; obtaining a management operation for the diagnostic data collection enhanced device using the diagnostic analysis; and updating operation of the diagnostic data collection enhanced device using the management operation.

Performing the communication channel analysis may include making a first determination regarding whether a management controller of the data processing system is operably connected to a processing complex of the data processing system; in a first instance of the first determination where the processing complex is operably connected to the management controller: making a second determination regarding whether a diagnostic data collection enhanced device managed by the management controller comprises a guest management controller; in a first instance of the second determination where the diagnostic data collection enhanced device comprises the guest management controller: identifying diagnostic data collection by the guest management controller as the process.

Performing the diagnostic data collection by the guest management controller may include invoking operation of a diagnostic data collection utility hosted by the guest management controller.

Performing the communication channel analysis may also include, in a second instance of the second determination where the diagnostic data collection enhanced device does not comprise the guest management controller: identifying diagnostic data collection by the management controller as the process.

Performing the diagnostic data collection by the management controller may include invoking operation of a diagnostic data collection utility hosted by the management controller to cause the management controller to invoke functionality of a field programmable gate array hosted by the diagnostic data collection enhanced device to obtain the diagnostic data.

Performing the communication channel analysis may also include, in a second instance of the first determination where the processing complex is not operably connected to the management controller: identifying diagnostic data collection by a processing complex of the data processing system as the process.

Performing the diagnostic data collection by the processing complex may include using an in-band communication channel between the processing complex and the diagnostic data collection enhanced device to obtain the diagnostic data.

In an embodiment, a non-transitory media is provided. The non-transitory media may include instructions that when executed by a processor cause the computer-implemented method to be performed.

In an embodiment, a data processing system is provided. The data processing system (or a management controller hosted by the data processing system) may include the non-transitory media and a processor, and may perform the computer-implemented method when the computer instructions are executed by the processor.

Figure 1:
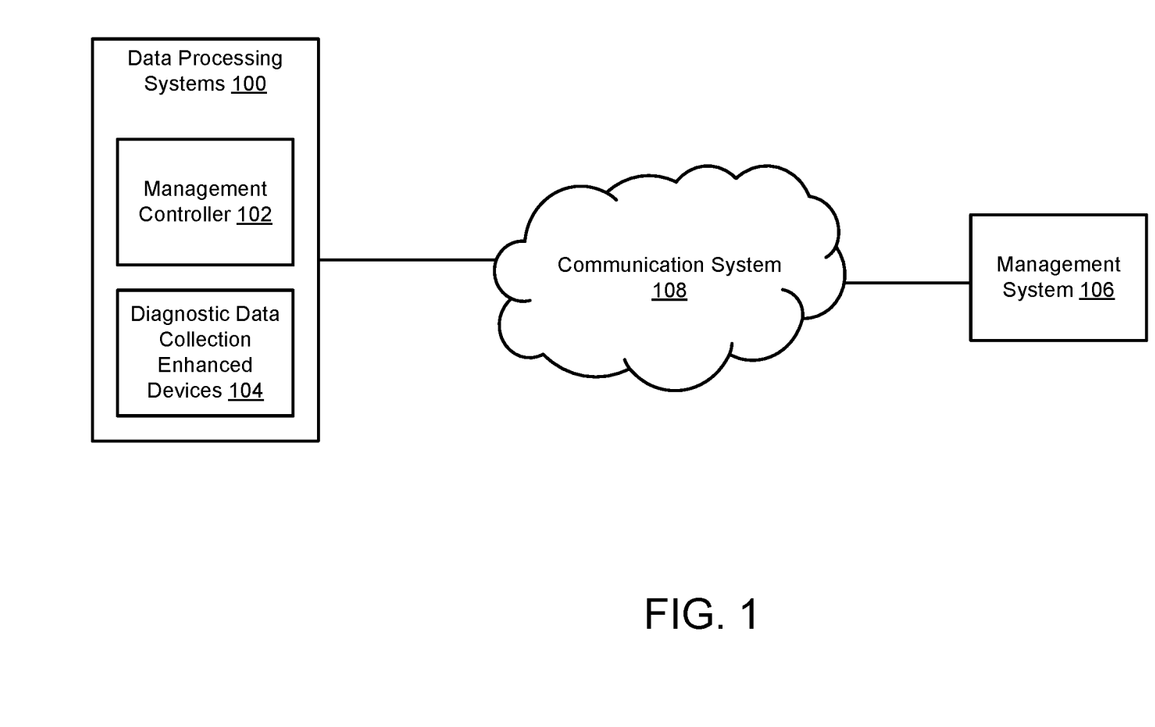
FIG. 1 shows a block diagram illustrating a system in accordance with an embodiment.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer-implemented services, the system may include any number of data processing systems 100. Data processing systems 100 may provide the computer implemented services to users of data processing systems 100 and/or to other devices (not shown), and/or may cooperate with other devices that provide the computer implemented services. Different data processing systems may provide similar and/or different computer implemented services.

For example, any of data processing systems 100 may be members of cloud environments that provide the computer implemented services. The cloud environments may include any number of devices that provide computer implemented services.

To provide the computer-implemented services, data processing systems 100 may include various hardware components (e.g., processors, memory modules, storage devices, etc.) and host various software components (e.g., operating systems, application, startup managers such as basic input-output systems, etc.). These hardware and software components may provide the computer-implemented services via their operation.

To provide certain computer-implemented services, the hardware and/or software components may need to operate in predetermined manners. If the hardware and/or software components do not operate in the predetermined manners, then a data processing system may be unable to provide all, or a portion, of the computer-implemented services that it normally provides.

In general, embodiments disclosed herein may provide methods, systems, and/or devices for managing the operation of data processing systems 100. To manage the operation of data processing system 100, management system 106 may (i) collect information regarding the operation of a data processing system, and/or components thereof, and (ii) modify the operation of the data processing system, and/or components hereof. By doing so, management system 106 may manage the operation of any number of data processing systems 100. Accordingly, the data processing systems may be more likely to successfully provide desired computer implemented services over time.

To collect information and modify the operation of the data processing system, management system 106 may communicate with management controllers (e.g., 102) hosted by data processing systems 102. Management controller 102 may (i) collect information regarding the operation of a host data processing system 100, (ii) providing all or portion of the information to management system 106, and (iii) cooperate with management system 106 to implement management operations that may modify the operation of components of the data processing systems.

To collect information regarding the operation of a host data processing system, management controller 102 may be operably connected to (i) a processing complex (e.g., processors and memory that may execute code) of a host data processing system, and (ii) various components of a host data processing system such as diagnostic data collection enhanced devices 104. Through the operable connections, management controller 102 may obtain information regarding the operation of these components.

A diagnostic data collection enhanced device may be a hardware device that may include functionality to collect information regarding its operation. For example, a diagnostic data collection enhanced device may include an embedded computing system (e.g., a guest management controller) that manages the operation of the diagnostic data collection enhanced device, or may include a lower complexity device such as a field programmable gate array that manages the operation of the diagnostic data collection enhanced device. The embedded computer or lower complexity device may include functionality to identify operation of various portions of the device, log information regarding operation of the device, modify configuration of the device, and/or perform other management functionalities. A diagnostic data collection enhanced device may be, for example, a graphics processing unit, a smart network interface card, a data processing unit, or any other types of devices that may include management capabilities. These diagnostic data collection enhanced device may cooperate with management controller 102 and/or management system 106 during data collection and/or management.

Figure 2A:
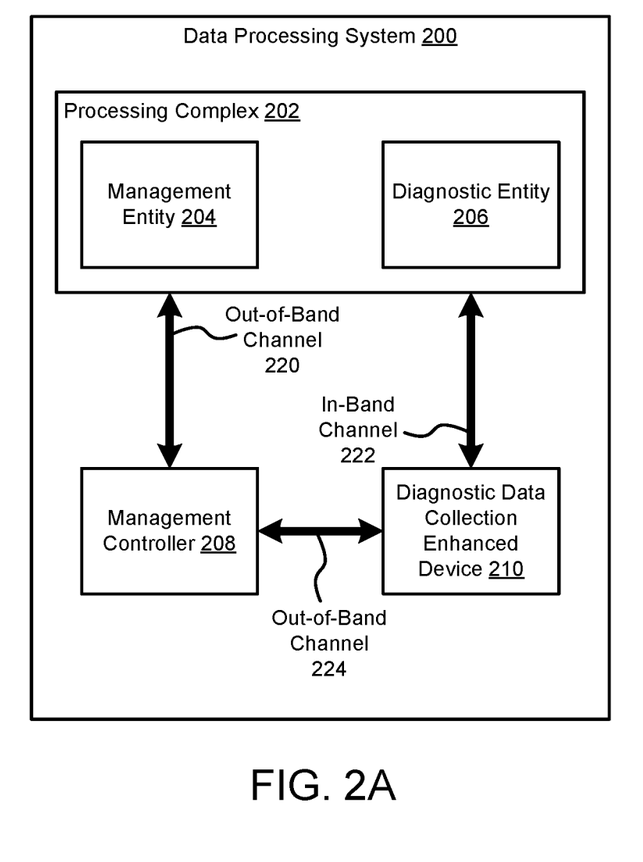
FIGS. 2A-2C show diagrams illustrating data flows in accordance with an embodiment.

However, the ability of management controller 102 to obtain the information may depend on the operable connections between the management controller and the other components. In the event of failure of one or more of the operable connections, data processing systems 100 may utilize alternative paths for obtaining information regarding the operation of components such as diagnostic data collection enhanced devices 104. Refer to FIG. 2A for additional details regarding connections between components of data processing systems 100.

Additionally, to collect information regarding the operation of a host data processing system, the capabilities of diagnostic data collection enhanced devices 104 may be taken into account. For example, some diagnostic data collection enhanced devices may include robust data collection, aggregation, consolidation, and/or reporting capabilities (e.g., in aggregate, referred to as "telemetry data collection capabilities"), while other diagnostic data collection enhanced devices may include limited telemetry data collection capabilities. If a diagnostic data collection enhanced device includes limited telemetry data collection capabilities, then either management controller 102 and/or the host processing complex may be tasked with managing the collection of data from the diagnostic data collection enhanced device. For example, the management controller or host processing complex may collect certain data, process the data, and/or otherwise perform telemetry data collection processes beyond the capabilities of the diagnostic data collection enhanced device.

Once the data is collected, the data may be used to, for example: (i) inform a user of a data processing system of the state of the data processing system, (ii) inform management system 106 of the state of the data processing system, (iii) identify management actions to be performed to manage the operation of the data processing system, and/or for other purposes.

Management system 106 may manage the operation of data processing systems 100 (e.g., the processing complexes of the data processing systems), and the hosted diagnostic data collection enhanced devices 104. To do so, management system 106 may obtain information regarding operation of diagnostic data collection enhanced devices 104 from management controller 102 to select management operations to be performed to manage operation of the data processing systems, and components thereof.

Figure 3A:
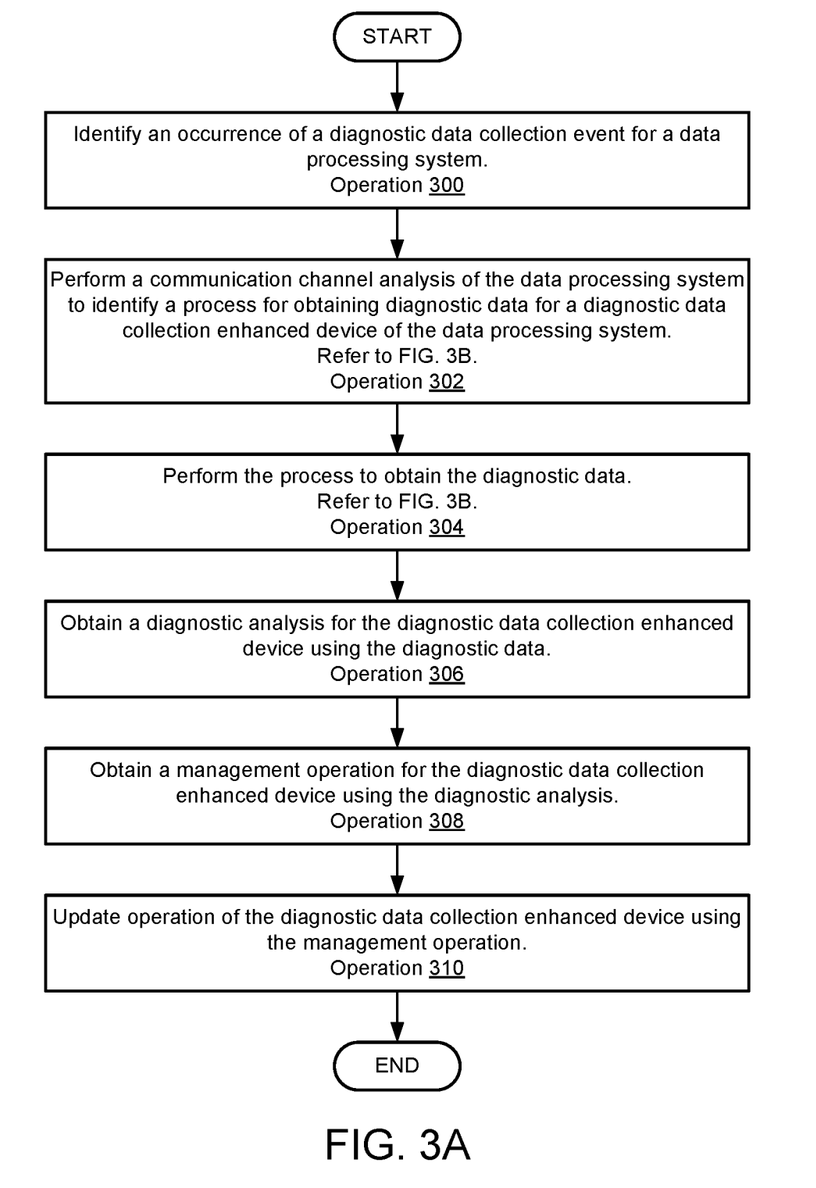
FIGS. 3A-3B show flow diagrams illustrating methods of managing operation of data processing systems in accordance with an embodiment.
Figure 3B:
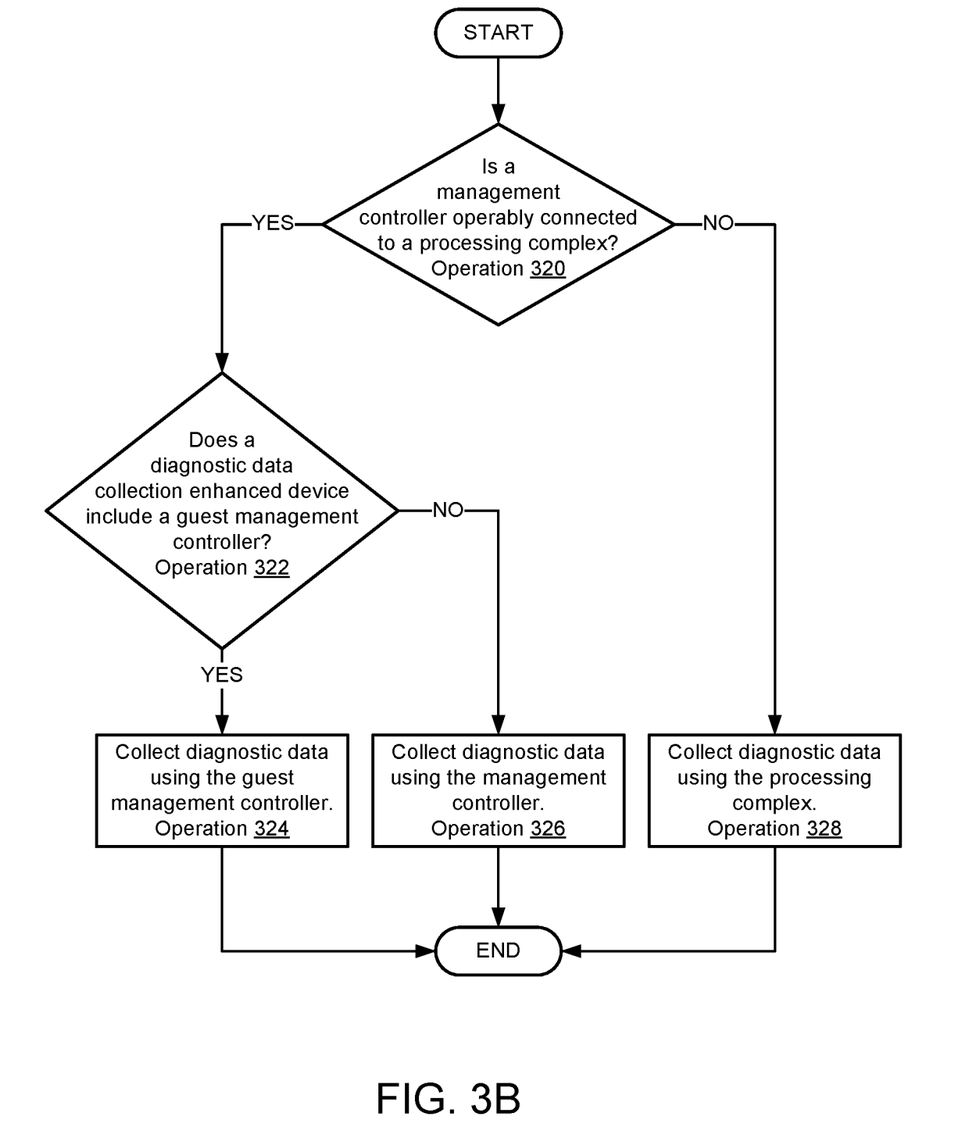

When providing their functionality, any of data processing system 100 and management system 106 may perform all, or a portion, of the methods illustrated in FIGS. 3A-3B.

Any of data processing systems 100 and/or management system 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Management system 106 may be implemented with multiple computing devices. The computing devices of management system 106 may cooperatively perform processes for managing the operation of data processing systems 100. The computing devices of management system 106 may perform similar and/or different functions.

Any of the components illustrated in FIG. 1 may be operably connected to each other (and/or components not illustrated) with communication system 108. In an embodiment, communication system 108 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Figure 2B:
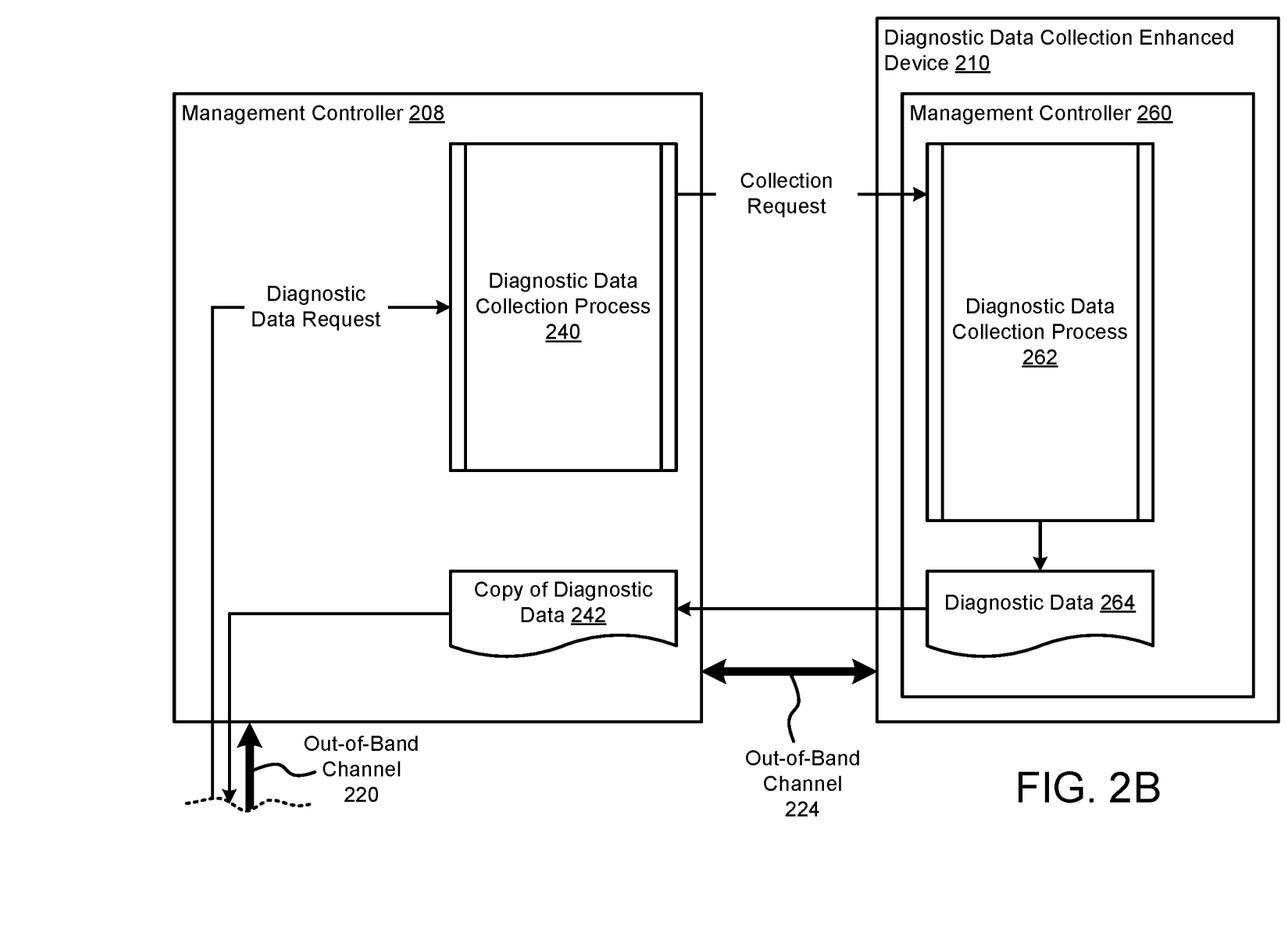
Figure 2C:
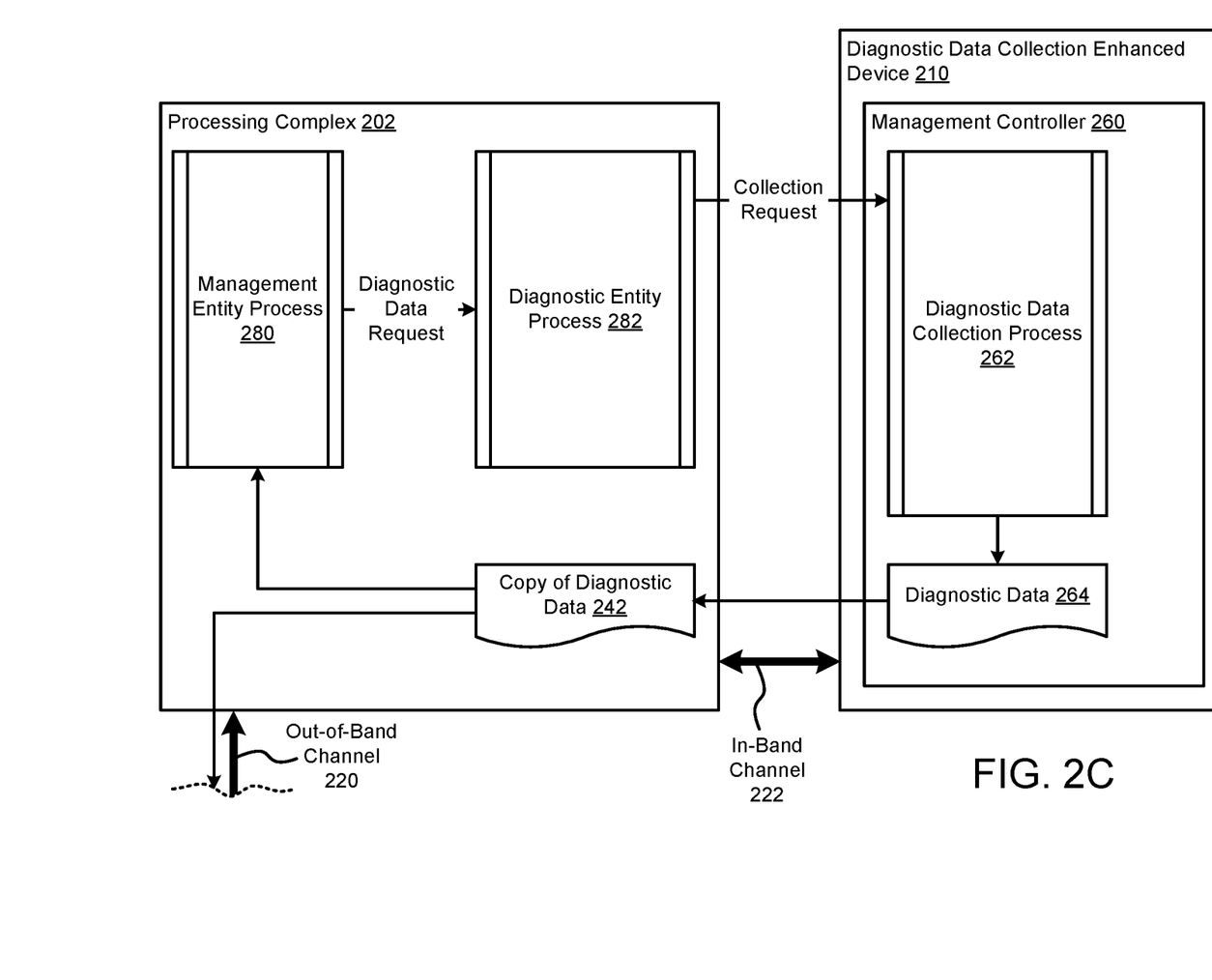

To further clarify embodiments disclosed herein, a diagram illustrating operable connections between components of a data processing system in accordance with an embodiment are shown in FIG. 2A, and diagrams illustrating data flows implemented by and data structures used by a system over time in accordance with an embodiment are shown in FIGS. 2B-2C.

Turning to FIG. 2A, a connectivity diagram illustrating connections between components of data processing system 200 in accordance with an embodiment is shown. Data processing system 200 may be similar to any of data processing systems 100.

Data processing system 200 may include processing complex 202, management controller 208, and diagnostic data collection enhanced device 210. Each of these components is discussed below.

Processing complex 202 may include any number of processors, memory modules, and/or other hardware components that support the execution of computer code (e.g., software). Processing complex 202 may host (e.g., through execution of computer code) management entity 204 and diagnostic entity 206.

Management entity 204 may manage the operation of in-band processes. Management entity 204 may be implemented using an operating system, drivers, etc.

Diagnostic entity 206 may assist in the management of diagnostic data collection enhanced device 210. For example, diagnostic entity 206 may retrieve copies of diagnostic data from diagnostic data collection enhanced device 210, may provide information regarding the diagnostic data to other devices (e.g., management controller 208), and may use the diagnostic data for other purposes (e.g., displaying information regarding operation of diagnostic data collection enhanced device 210 to a user of data processing system 200). Diagnostic entity 206 may be implemented using a utility, drivers, etc.

To communicate with management controller 208 and/or diagnostic data collection enhanced device 210, processing complex 202 may be operably connected via out-of-band channel 220 and in-band channel 222. Out-of-band channel 220 may be implemented with a management channel such as a management bus. In-band channel 222 may be implemented with a general purposes data bus such as, for example, a Peripheral Component Interconnect Express (PCIe) bus.

Management controller 208 may be similar to management controller 102.

Diagnostic data collection enhanced device 210 may be similar to any of diagnostic data collection enhanced devices 104. While illustrated with a single diagnostic data collection enhanced device, data processing system 200 may include any number of diagnostic data collection enhanced devices without departing from embodiments disclosed herein.

Management controller 208 may be operably connected to diagnostic data collection enhanced device 210 via out-of-band channel 224. Like out-of-band channel 220, out-of-band channel 224 may be implemented using a management channel.

Additionally, while not shown here, management controller 208 may be operably connected to management system 106 via out-of-band channels (e.g., if management controller 208 presents itself as an end point in a network environment), or may use connectivity through processing complex 202 (e.g., which may present itself as an end point) to communicate with management system 106.

The channels between the components of data processing system 200 may limit how diagnostic data may be retrieved. For example, if out-of-band channel 224 is inoperable, then diagnostic data may only be retrieved via in-band channel 222.

Similarly, depending on the components of diagnostic data collection enhanced device 210, the process for obtaining the diagnostic data may be orchestrated by diagnostic data collection enhanced device 210 (e.g., if it includes a guest management controller) or either processing complex 202 or management controller 208 (e.g., if it does not include a guest management controller but instead includes a lower complexity management device such as a field programmable gate array).

As will be discussed in greater detail below, data processing system 200 may perform different processes for obtaining diagnostic data depending on the connectivity and capabilities of components of data processing system 200.

Turning to FIG. 2B, a first data flow diagram illustrating data flows, data processing, and/or other operations that may be performed by the system of FIG. 1 in accordance with an embodiment is shown.

Consider a first scenario in which a data processing system hosts management controller 208 and diagnostic data collection enhanced device 210. In this scenario, both out-of-band channel 220 and out-of-band channel 224 may be operable.

To manage the operation of diagnostic data collection enhanced device 210, a processing complex of a host data processing system may send a diagnostic data request to management controller 208. During operation, management controller 208 may perform diagnostic data collection process 240. Diagnostic data collection process 240 may obtain and act on the diagnostic data request. For example, the request may be reviewed to identify, for example, types of diagnostic data to be obtained and from which devices to collect the data. In this first scenario, the diagnostic data request may indicate that diagnostic data for diagnostic data collection enhanced device 210 is to be collected.

Based on the indication, a collection request may be sent to diagnostic data collection process 262 hosted by management controller 260 via out-of-band channel 224. The collection request may invoke diagnostic data collection functionality of management controller 260. The invoked functionality may collect various information (e.g., as specified in the collection request) regarding the operation of diagnostic data collection enhanced device 210. The collected data may be aggregated as diagnostic data 264. In this scenario, management controller 208 relies on the functionality of management controller 260 for data collection management. However, if diagnostic data collection enhanced device 210 instead hosted a lower capability device, such as a field programmable gate array, in place of management controller 260, then management controller 208 may not rely on diagnostic data collection functionality of diagnostic data collection enhanced device 210.

In such a case, diagnostic data collection process 240 (or another process) may diagnostic data collection from diagnostic data collection enhanced device 210. For example, a collection request with detailed instructions regarding the type of data to be collected, sampling intervals and/or other methodological information for data collection, and/or other information to manage diagnostic data collection may be included in collection request. Consequently, a field programmable gate array or other type of device may not need to include diagnostic data collection functionality because the device may simply implement the process specified by management controller 208.

In either approach, the resulting diagnostic data 264 may be provided to management controller 208. Management controller 208 may stored it locally (e.g., as copy of diagnostic data 242), remotely, and/or in other locations (e.g., in-memory) for future use.

Once obtained, copy of diagnostic data 242 may be used to manage the operation of diagnostic data collection enhanced device 210. For example, information based on diagnostic data collection enhanced device 210 may be provided to other components (e.g., a processing complex) of a host data processing system, and/or other devices (e.g., management system 106). In another example, copy of diagnostic data 242 may be used as part of locally executing management processes and/or remotely executing management processes. A management process hosted by processing complex 202 (or other devices such as management system 106) may use information from copy of diagnostic data 242 to select and initiate performance of management operations by diagnostic data collection enhanced device 210. The management operations may modify the operation of diagnostic data collection enhanced device 210.

Turning to FIG. 2C, a second data flow diagram illustrating data flows, data processing, and/or other operations that may be performed by the system of FIG. 1 in accordance with an embodiment is shown.

Consider a second scenario in which a data processing system includes processing complex 202 and diagnostic data collection enhanced device 210. In this second scenario, out-of-band channel 220 is operable, but out-of-band channel 224 may be inoperable. Consequently, management controller 208 may be unable to directly communicate with diagnostic data collection enhanced device 210.

To manage the operation of diagnostic data collection enhanced device 210, processing complex 202 may host management entity process 280. Management entity process 280 may provide management functionality (e.g., operating system, drivers, utilities, etc.) for the host data processing system. As part of that management functionality, management entity process 280 may send a diagnostic data request to a diagnostic entity process 282 hosted by processing complex 202 (e.g., rather than to management controller 208).

Diagnostic entity process 282 may correspond to a utility or other entity usable to acquire and use diagnostic data from diagnostic data collection enhanced device 210 for management purposes. For example, the utility or other entity may display information regarding the operation of diagnostic data collection enhanced device 210 to a user of the host data processing system such that the user may make more informed decisions regarding use of diagnostic data collection enhance device 210.

In response to the diagnostic data request, diagnostic entity process 282 may send a collection request to management controller 260 (or a lower complexity device, depending on the components of diagnostic data collection enhanced device 210) via in-band channel 222. Similarly to as described with respect to FIG. 2B, the content of collection request may depend on whether diagnostic data collection enhanced device 210 includes management controller 260 or a lower complexity device that may not include diagnostic data collection function (or diagnostic data collection function of sufficient capabilities on its own). When obtained by diagnostic data collection enhanced device 610, diagnostic data collection process 262 may be performed, as described with respect to FIG. 2B, to obtain diagnostic data 264.

A copy of diagnostic data 264 (and/or information based on it) may be provided to processing complex 202. The information may be stored as copy of diagnostic data 242 (e.g., in memory or in a storage device that is not shown in FIG. 2C). Once obtained, copy of diagnostic data 242 may be (i) ingested or otherwise used by management entity process 280 and/or diagnostic entity process 282 to manage the operation of diagnostic data collection enhanced device 210, and (ii) provided to a management controller (e.g., such that a management system may have access and use the diagnostic data for management purposes) via out-of-band channel 220.

Thus, via the data flows shown in FIGS. 2B-2C, embodiments disclosed here may facilitate acquisition and use of diagnostic data from diagnostic data collection enhanced devices even when some channels are inoperable and/or for diagnostic data collection enhanced devices with varying capabilities (e.g., diagnostic data collection functionality, or lack thereof).

In an embodiment, any of management controller 102, processing complex 202, and management controller 208 are implemented using a hardware device including circuitry. The hardware device may be, for example, a digital signal processor, a field programmable gate array, or an application specific integrated circuit. The circuitry may be adapted to cause the hardware device to perform the functionality of management controller 102, processing complex 202, and/or management controller 208 as discussed herein. Management controller 102, processing complex 202, and/or management controller 208 may be implemented using other types of hardware devices without departing embodiment disclosed herein.

In an embodiment, any of management controller 102, processing complex 202, and/or management controller 208 are implemented using a processor adapted to execute computing code stored on a persistent storage that when executed by the processor performs the functionality of management controller 102, processing complex 202, and/or management controller 208 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, any of management controller 102, processing complex 202, and/or management controller 208 include or be operably connected to storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store any of the data structures discussed herein. Any of these data structures may be implemented using, for example, lists, tables databases, linked lists, unstructured data, and/or other types of data structures.

As discussed above, the components of FIG. 1 may perform various methods to manage operation of data processing systems. FIGS. 3A-3B illustrate methods that may be performed by the components of the system of FIG. 1. In the diagram discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of managing diagnostic data collection enhanced devices in accordance with an embodiment is shown. The method may be performed by any of data processing systems 100, management controller 102, management controller 208, processing complex 202, and/or other components of the system shown in FIG. 1.

At operation 300, an occurrence of a diagnostic data collection event for a data processing system is identified. The occurrence may be identified by (i) obtaining an indication of the occurrence from another device (e.g., management system 106), (ii) obtaining an indication of the occurrence from another component (e.g., a management controller hosted by a data processing system which may monitor for and manage operation of diagnostic data collection enhanced devices), (iii) identifying a condition (e.g., a point in time, a type of operation that has occurred, etc.) that is present indicating the occurrence, (iv) obtain user input indicating the occurrence (e.g., the user input may request information regarding the operation of the diagnostic data collection enhance device), and/or via other methods.

At operation 302, a communication channel analysis of the data processing system is performed to identify a process for obtaining diagnostic data for a diagnostic data collection enhanced device. The process may indicate (i) which entity is to manage the data collection process, (ii) which entity is to perform or initiate the process, (iii) where the resulting diagnostic data is to be stored, etc. The selected process may depend on which communication channels are operable and the complexity of the diagnostic data collection enhanced device. The communication channel analysis may be performed via the method shown in FIG. 3B, and/or via other methods.

At operation 304, the process to obtain the diagnostic data is performed. The process may be performed by initiating performance of one or more actions indicated by the process by corresponding entities indicated by the process. The process may be performed via the method shown in FIG. 3B, and/or via other methods.

The process may include (i) initiating, by a management controller or a processing complex, data collection from the diagnostic data collection enhance device, and (ii) management, by the management controller, processing complex, or a management controller of the diagnostic data collection enhance device, of the diagnostic data collection process.

At operation 306, a diagnostic analysis for the diagnostic data collection enhanced device is obtained using the diagnostic data. The diagnostic analysis may be obtained by performing one or more algorithmic analysis of the diagnostic data. The diagnostic analysis may indicate (i) conditions to which the diagnostic data collection enhanced device is subjected, (ii) one or more management operations that are likely to improve or otherwise manage the conditions, and/or other information which may be used to select how and implement management for the diagnostic data collection enhanced device.

At operation 308, a management operation for the diagnostic data collection enhanced device is obtained using the diagnostic analysis. The management operation may be any of the one or more managements operations indicated by the diagnostic analysis. The management operation may be selected algorithmically without user feedback, by presenting the management operations to the user and allowing the user to select the management operation to perform, by providing information regarding the diagnostic data and/or diagnostic analysis to a management system and receiving the management operation from the management system, etc.

At operation 310, operation of the diagnostic data collection enhanced device is updated using the management operation. The operation may be updated by invoking one or more functions of the diagnostic data collection enhanced device based on the management operation. The invoked functionality may modify the operation of the diagnostic data collection enhanced device.

The method may end following operation 310.

Using the method illustrated in FIG. 3A, embodiments disclosed herein may provide a data processing system that may be more likely to be able to manage diagnostic data collection enhance devices.

Turning to FIG. 3B, a flow diagram illustrating a method of identifying and performing a process in accordance with an embodiment is shown. The method may be performed by any of data processing systems 100, management controller 102, management controller 208, processing complex 202, and/or other components of the system shown in FIG. 1.

At operation 320, a determination is made regarding whether a management controller of a host data processing system is operably connected to a processing complex of the data processing system. The determination may be made based on an operable status (e.g., indicating whether the management controller and processing complex are operably connected) of an out of band management channel between the management controller and the processing complex. The operable status may be determined by, for example, an operating system or other management entity hosted by the processing complex. The operating system or other management entity may be responsible for testing and managing the out of band channel.

If the management controller is operably connected to the processing complex, then the method may proceed to operation 322. For example, if the two are connected, then an entity hosted by the processing complex may send a request for diagnostic data to the management controller. If the management controller is not operably connected to the processing complex, then the method may proceed to operation 328.

AT operation 322, a determination is made regarding whether a diagnostic data collection enhanced device include a guest management controller. The determination may be made based on an inventory and/or capability analysis of the diagnostic data collection enhanced device. The inventory and/or capability analysis may be maintained by the management controller as part of its regular operation.

If the diagnostic data collection enhanced device includes the guest management controller, then the method may proceed to operation 324. Otherwise, the method may proceed to operation 326.

Operations 324-228 may be processes of a group of processes from which the process discussed with respect to operations 302-304 may be selected. Performance of the processes may complete the performance of the process discussed with respect to operation 304.

At operation 324, diagnostic data is collected using the guest management controller. The diagnostic data may be collected by invoking diagnostic data collection functionality of the guest management controller. The invoked functionality may manage the diagnostic data collection. The functionality may be invoked by a management controller hosted by the data processing system (e.g., responsive to a diagnostic data collection request from a processing complex, management system, and/or other entity).

The method may end following operation 324.

At operation 326, diagnostic data is collected using the management controller. The diagnostic data may be collected by generating and sending detailed steps for collecting the diagnostic data to a field programmable gate array (or other type of low complexity device) of the diagnostic data collection enhanced device. The low complexity device may perform the operations indicated by the detailed steps thereby collecting the diagnostic data. The method may end following operation 326.

At operation 328, diagnostic data is collected using the processing complex. The diagnostic data may be collected by invoking diagnostic data collection functionality of the guest management controller and/or sending detailed collection instructions to a low complexity device. The invoked functionality may manage the diagnostic data collection or the performance of the detailed steps may result in collection of the diagnostic data.

The method may end following operation 328.

Using the method shown in FIG. 3B, diagnostic data may be collected under a variety of different conditions thereby allowing for continued management of diagnostic data collection enhanced devices.

Figure 4:
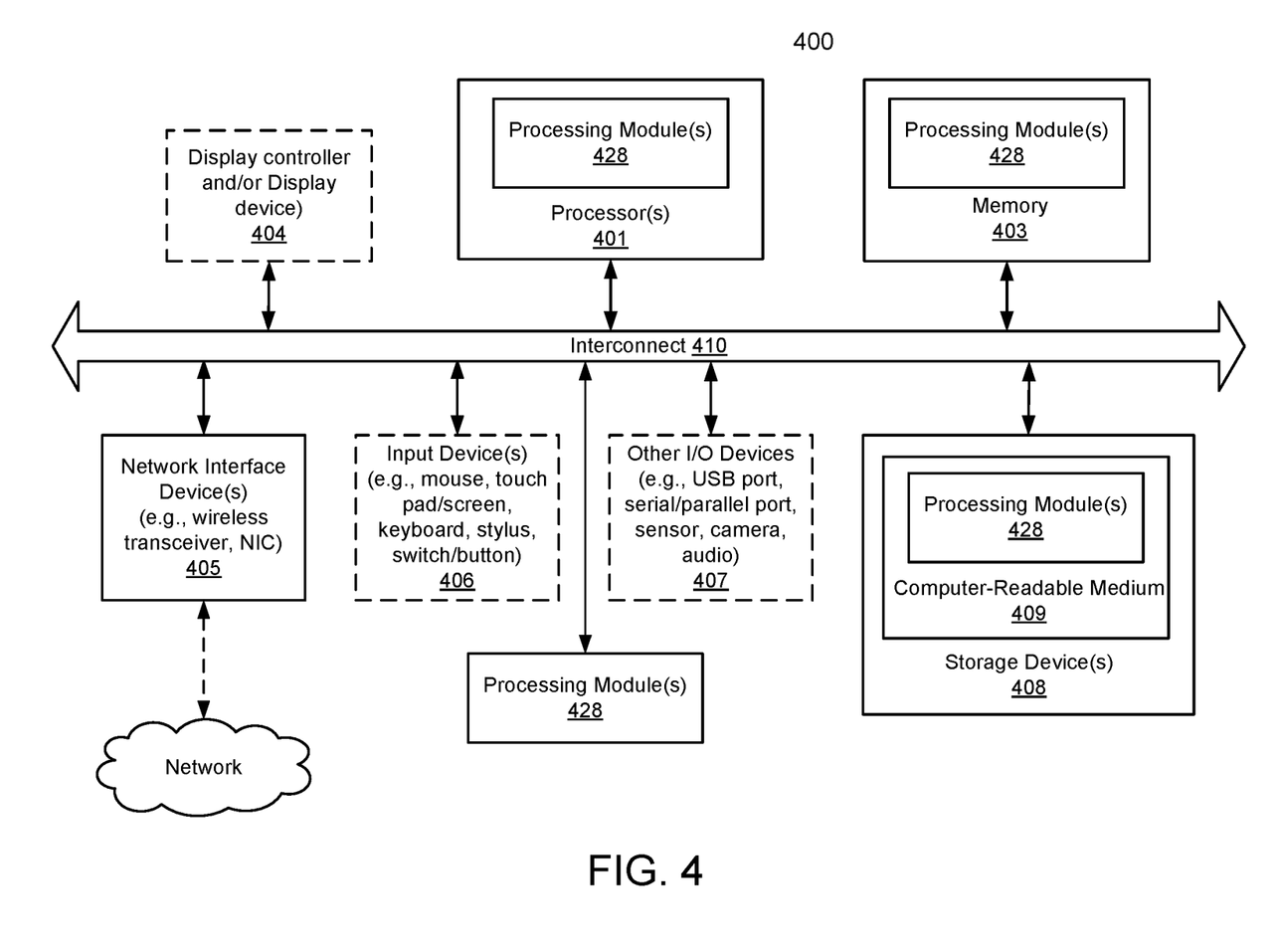
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing diagnostic data collection to manage operation of a data processing system, the method comprising:
   identifying, by a management controller disposed internally within the data processing system that is separate and distinct from a processor of the data processing system, an occurrence of a diagnostic data collection event for the data processing system;

based on identifying the occurrence and by the management controller:

performing a communication channel analysis of the data processing system to identify a process for obtaining diagnostic data for a diagnostic data collection enhanced device of the data processing system, wherein the diagnostic data collection enhanced device is separate and distinct from the management controller and the diagnostic data collection enhanced device is also disposed internally within the data processing system;

obtaining a diagnostic analysis for the diagnostic data collection enhanced device using the diagnostic data;

obtaining a management operation for the diagnostic data collection enhanced device using the diagnostic analysis; and updating operation of the diagnostic data collection enhanced device using the management operation.

2. The method of claim 1, wherein performing the communication channel analysis comprises:

making a first determination regarding whether the management controller of the data processing system is operably connected to a processing complex of the data processing system, wherein the processing complex comprises the processor;

in a first instance of the first determination where the processing complex is operably connected to the management controller:

making a second determination regarding whether the diagnostic data collection enhanced device managed by the management controller comprises a guest management controller;

in a first instance of the second determination where the diagnostic data collection enhanced device comprises the guest management controller:

identifying diagnostic data collection by the guest management controller as the process, wherein the management controller, the processing complex, the diagnostic data collection enhanced device, and the guest management controller are all internal components disposed within the data processing system.

3. The method of claim 2, wherein performing the diagnostic data collection by the guest management controller comprises:

invoking operation of a diagnostic data collection utility hosted by the guest management controller.

4. The method of claim 2, wherein performing the communication channel analysis further comprises:

in a second instance of the second determination where the diagnostic data collection enhanced device does not comprise the guest management controller:

identifying diagnostic data collection by the management controller as the process.

5. The method of claim 4, wherein performing the diagnostic data collection by the management controller comprises:

invoking operation of a diagnostic data collection utility hosted by the management controller to cause the management controller to invoke functionality of a field programmable gate array hosted by the diagnostic data collection enhanced device to obtain the diagnostic data.

6. The method of claim 4, wherein performing the communication channel analysis further comprises:

in a second instance of the first determination where the processing complex is not operably connected to the management controller:

identifying diagnostic data collection by a processing complex of the data processing system as the process.

7. The method of claim 3, wherein the management controller is connected to the diagnostic data collection enhanced device, internally within the data processing system, via an out-of-band channel.

8. A non-transitory machine-readable medium having instructions stored therein, which when executed by a processor, cause the processor to perform operations for managing diagnostic data collection to manage operation of a data processing system, the operations comprising:

identifying, by a management controller disposed internally within the data processing system that is separate and distinct from a processor of the data processing system, an occurrence of a diagnostic data collection event for the data processing system;

based on identifying the occurrence and by the management controller:

performing a communication channel analysis of the data processing system to identify a process for obtaining diagnostic data for a diagnostic data collection enhanced device of the data processing system, wherein the diagnostic data collection enhanced device is separate and distinct from the management controller and the diagnostic data collection enhanced device is also disposed internally within the data processing system;

obtaining a diagnostic analysis for the diagnostic data collection enhanced device using the diagnostic data;

obtaining a management operation for the diagnostic data collection enhanced device using the diagnostic analysis; and updating operation of the diagnostic data collection enhanced device using the management operation.

9. The non-transitory machine-readable medium of claim 8, wherein performing the communication channel analysis comprises:

making a first determination regarding whether the management controller of the data processing system is operably connected to a processing complex of the data processing system, wherein the processing complex comprises the processor;

in a first instance of the first determination where the processing complex is operably connected to the management controller:

making a second determination regarding whether the diagnostic data collection enhanced device managed by the management controller comprises a guest management controller;

in a first instance of the second determination where the diagnostic data collection enhanced device comprises the guest management controller:

identifying diagnostic data collection by the guest management controller as the process.

10. The non-transitory machine-readable medium of claim 9, wherein performing the diagnostic data collection by the guest management controller comprises:

invoking operation of a diagnostic data collection utility hosted by the guest management controller.

11. The non-transitory machine-readable medium of claim 9, wherein performing the communication channel analysis further comprises:
in a second instance of the second determination where the diagnostic data collection enhanced device does not comprise the guest management controller:
identifying diagnostic data collection by the management controller as the process.

12. The non-transitory machine-readable medium of claim 11, wherein performing the diagnostic data collection by the management controller comprises:
invoking operation of a diagnostic data collection utility hosted by the management controller to cause the management controller to invoke functionality of a field programmable gate array hosted by the diagnostic data collection enhanced device to obtain the diagnostic data.

13. The non-transitory machine-readable medium of claim 11, wherein performing the communication channel analysis further comprises:
in a second instance of the first determination where the processing complex is not operably connected to the management controller:
identifying diagnostic data collection by a processing complex of the data processing system as the process.

14. The non-transitory machine-readable medium of claim 13, wherein performing the diagnostic data collection by the processing complex comprises:
using an in-band communication channel between the processing complex and the diagnostic data collection enhanced device to obtain the diagnostic data.

15. A data processing system, comprising:
a diagnostic data collection enhanced device;
a management controller disposed internally within the data processing system; and
a processing complex comprising:
a processor that is separate and distinct from the management controller; and
a memory coupled to the processor to store instructions, which when executed by the processor, cause the processor to perform operations for managing diagnostic data collection to manage operation of a data processing system, the operations comprising, by the management controller:
identifying an occurrence of a diagnostic data collection event for the data processing system;
based on identifying the occurrence:
performing a communication channel analysis of the data processing system to identify a process for obtaining diagnostic data for the diagnostic data collection enhanced device, wherein the diagnostic data collection enhanced device is separate and distinct from the management controller and the diagnostic data collection enhanced device is also disposed internally within the data processing system;
obtaining a diagnostic analysis for the diagnostic data collection enhanced device using the diagnostic data;
obtaining a management operation for the diagnostic data collection enhanced device using the diagnostic analysis; and
updating operation of the diagnostic data collection enhanced device using the management operation.

16. The data processing system of claim 15, wherein performing the communication channel analysis comprises:
making a first determination regarding whether the management controller of the data processing system is operably connected to the processing complex of the data processing system;
in a first instance of the first determination where the processing complex is operably connected to the management controller:
making a second determination regarding whether the diagnostic data collection enhanced device managed by the management controller comprises a guest management controller;
in a first instance of the second determination where the diagnostic data collection enhanced device comprises the guest management controller:
identifying diagnostic data collection by the guest management controller as the process.

17. The data processing system of claim 16, wherein performing the diagnostic data collection by the guest management controller comprises:
invoking operation of a diagnostic data collection utility hosted by the guest management controller.

18. The data processing system of claim 16, wherein performing the communication channel analysis further comprises:
in a second instance of the second determination where the diagnostic data collection enhanced device does not comprise the guest management controller:
identifying diagnostic data collection by the management controller as the process.

19. The data processing system of claim 18, wherein performing the diagnostic data collection by the management controller comprises:
invoking operation of a diagnostic data collection utility hosted by the management controller to cause the management controller to invoke functionality of a field programmable gate array hosted by the diagnostic data collection enhanced device to obtain the diagnostic data.

20. The data processing system of claim 18, wherein performing the communication channel analysis further comprises:
in a second instance of the first determination where the processing complex is not operably connected to the management controller:
identifying diagnostic data collection by a processing complex of the data processing system as the process.

* * * * *